United States Patent
Popp et al.

(10) Patent No.: US 11,860,816 B2
(45) Date of Patent: Jan. 2, 2024

(54) METHODS AND SYSTEMS FOR ARCHIVING AND RETRIEVING DATA

(71) Applicant: Archive360, Inc., New York, NY (US)

(72) Inventors: Tiberiu Popp, Greenlawn, NY (US); Nick Czeczulin, Incline Village, NV (US); Robert Desteno, Rutherford, NJ (US)

(73) Assignee: Archive360, LLC, New York, NY (US)

( * ) Notice: Subject to any disclaimer, the term of this patent is extended or adjusted under 35 U.S.C. 154(b) by 794 days.

(21) Appl. No.: 16/306,257

(22) PCT Filed: May 30, 2017

(86) PCT No.: PCT/US2017/035015
§ 371 (c)(1),
(2) Date: Nov. 30, 2018

(87) PCT Pub. No.: WO2017/210197
PCT Pub. Date: Dec. 7, 2017

(65) Prior Publication Data
US 2019/0220440 A1    Jul. 18, 2019

Related U.S. Application Data

(60) Provisional application No. 62/344,201, filed on Jun. 1, 2016.

(51) Int. Cl.
*G06F 16/22*    (2019.01)
*G06F 16/11*    (2019.01)
(Continued)

(52) U.S. Cl.
CPC ............ *G06F 16/113* (2019.01); *G06F 16/22* (2019.01); *G06F 16/24568* (2019.01);
(Continued)

(58) Field of Classification Search
CPC .. G06F 16/113; G06F 16/24568; G06F 16/22; G06Q 30/02; G06Q 30/06; H04L 29/06; H04L 29/08
See application file for complete search history.

(56) References Cited

U.S. PATENT DOCUMENTS 8,615,517 B1    12/2013    Vice et al.
8,959,067 B1     2/2015    Patiejunas et al.
(Continued)

FOREIGN PATENT DOCUMENTS

| CA | 2788019 A1 * | 2/2013 | ......... G06Q 10/0835 |
| EP | 2988512 A1 * | 2/2016 | ........... G06F 16/951 |

OTHER PUBLICATIONS

International Search Report and Written Opinion for PCT/US2017/035015, dated Sep. 21, 2017.
(Continued)

*Primary Examiner* — Tarek Chbouki
(74) *Attorney, Agent, or Firm* — Wiley Rein LLP

(57) ABSTRACT

Data items are archived by separating them into two or more data streams according to common characteristics or categories. Data item properties, including custodian and date properties, are defined for the items in each stream. A record manifest, including metadata corresponding to the data item properties for the stream, is created. The data items and the manifest are stored. The data items are indexed only on demand, and only to the extent necessary to satisfy the demand. When data is restored from archival storage, it is combined with the stub in a manner that treats the stub and stored data as complementary parts, thus preserving any changes to the stub that are not reflected in the archive copy.

10 Claims, 4 Drawing Sheets

(51) Int. Cl.
  *G06Q 30/06* (2023.01)
  *G06Q 30/02* (2023.01)
  *H04L 9/40* (2022.01)
  *H04L 51/42* (2022.01)
  *H04L 65/40* (2022.01)
  *G06F 16/2455* (2019.01)
  *G06Q 10/10* (2023.01)
  *H04L 67/1097* (2022.01)

(52) U.S. Cl.
  CPC ............ *G06Q 30/02* (2013.01); *G06Q 30/06* (2013.01); *H04L 9/40* (2022.05); *H04L 51/42* (2022.05); *H04L 65/40* (2013.01); *G06Q 10/10* (2013.01); *H04L 67/1097* (2013.01)

(56) References Cited

U.S. PATENT DOCUMENTS

| | | | |
|---|---|---|---|
| 8,965,899 | B1 | 2/2015 | Van Rotterdam |
| 10,277,928 | B1* | 4/2019 | Joliveau ............ H04N 21/25808 |
| 10,440,436 | B1* | 10/2019 | Taylor .................. H04N 21/812 |
| 10,652,603 | B2* | 5/2020 | Millar .............. H04N 21/26258 |
| 10,708,331 | B1* | 7/2020 | Joliveau ................ H04L 65/613 |
| 10,771,824 | B1* | 9/2020 | Haritaoglu ......... H04N 21/6373 |
| 2005/0108435 | A1 | 5/2005 | Nowacki et al. |
| 2005/0234850 | A1* | 10/2005 | Buchheit ................ H04L 51/16 |
| 2008/0229037 | A1 | 9/2008 | Bunte et al. |
| 2011/0191428 | A1* | 8/2011 | Nairn ...................... H04L 51/28 |
| | | | 709/206 |
| 2011/0196934 | A1* | 8/2011 | Sheer ...................... H04L 51/00 |
| | | | 709/206 |
| 2011/0246964 | A1 | 10/2011 | Cox, III et al. |
| 2012/0233130 | A1 | 9/2012 | Vedachalam et al. |
| 2013/0339314 | A1* | 12/2013 | Carpentier ............ G06F 3/0641 |
| | | | 707/E17.005 |
| 2013/0339818 | A1* | 12/2013 | Baker ................... G06F 3/0667 |
| | | | 714/763 |
| 2014/0157435 | A1 | 6/2014 | Stamos et al. |
| 2014/0164255 | A1 | 6/2014 | Daly et al. |
| 2014/0281009 | A1* | 9/2014 | Moorthy .......... H04N 21/85406 |
| | | | 709/231 |
| 2015/0212889 | A1 | 7/2015 | Amarendran et al. |
| 2016/0134593 | A1* | 5/2016 | Gvili ................... H04L 63/0428 |
| | | | 713/170 |
| 2016/0154710 | A1* | 6/2016 | Wade .................. G06F 11/1438 |
| | | | 714/19 |
| 2016/0224799 | A1* | 8/2016 | Uzun .................. G06F 21/6227 |
| 2016/0307596 | A1* | 10/2016 | Hardin .................. H04L 65/611 |
| 2017/0161333 | A1* | 6/2017 | Chen ................. G06F 16/24568 |
| 2017/0195375 | A1* | 7/2017 | Thubert ................ H04L 65/403 |
| 2017/0339114 | A1* | 11/2017 | Watson ............... H04N 21/2351 |
| 2017/0346865 | A1* | 11/2017 | Hartman .......... H04N 21/25875 |
| 2017/0357703 | A1* | 12/2017 | Theimer ............... G06F 16/258 |

OTHER PUBLICATIONS

Supplementary Partial European Search Report for EP 17807334.2, dated Sep. 9, 2019.
Robinson, Dan. "Speeding Up PostgreSQL With Partial Indexes," Dec. 10, 2014, Retrieved from https://heap.io/blog/engineering/speeding-up-postgresql-queries-with-partial-indexes.
Wort, Steven. "Why Use Both Partitioned Tables and Indexes?" Dec. 13, 2015, Retrieved from https://logicalread.com/2013/01/26/sql-server-partitioined-tables-and-indexes-w02/#.XcmjZDM3mUk.
Notification of Transmittal of International Preliminary Amendment on Patentability for PCT/US2017/035015, dated Dec. 13, 2018.

* cited by examiner

METHODS AND SYSTEMS FOR ARCHIVING AND RETRIEVING DATA

CROSS-REFERENCE TO RELATED APPLICATIONS

The instant application claims the benefit of U.S. provisional application No. 62/344,201, filed 1 Jun. 2016, which is hereby incorporated by reference as though fully set forth herein.

BACKGROUND

The instant disclosure relates to the archival, search, retrieval, and restoration of data In particular, the instant disclosure relates to methods and systems that permit real time data search and retrieval in a manner that preserves chain of custody and other important data characteristics.

BRIEF SUMMARY

Disclosed herein is a method of archiving data, including the steps of: receiving a data stream to be archived, the data stream including one or more data items; defining a plurality of data item properties for the data stream; creating a record manifest for the data stream, wherein the record manifest includes metadata for the one or more data items in the data stream, wherein the metadata corresponds to the plurality of data item properties for the data stream; and storing the data stream and the record manifest for the data stream.

The plurality of data item properties for the data stream can include a data item date property and a data item custodian property.

The method can also include: receiving a search query including a plurality of search criteria, the plurality of search criteria including a data item date criterion and a data item custodian criterion; indexing the stored data stream after receiving the search query; applying the search query to the indexed stored data stream; returning search results after applying the search query to the indexed stored data stream. According to aspects of the disclosure, the step of indexing the stored data stream after receiving the search query can include indexing only data items within the stored data stream matching the data item date criterion and the data item custodian criterion. According to other aspects of the disclosure, the step of indexing the stored data stream after receiving the search query can include indexing only data item properties of the stored data stream corresponding to the plurality of search criteria.

According to other embodiments, the step of receiving a data stream to be archived can include: receiving a plurality of data items to be archived; separating the plurality of data items to be archived into a plurality of data streams according to a plurality of preset criteria. The receiving, defining, creating, and storing steps can be repeated for each data stream of the plurality of data streams. In addition, the method can include: receiving a search query including a plurality of search criteria that correspond to data item properties common to two or more stored data streams of the plurality of stored data streams; indexing the two or more stored data streams after receiving the search query; applying the search query to the two or more indexed stored data streams; returning search results after applying the search query to the two or more indexed stored data streams. According to aspects of the disclosure, the step of indexing the two or more stored data streams after receiving the search query can include indexing only data item properties of the two or more stored data streams corresponding to the plurality of search criteria. Alternatively or additionally, the plurality of search criteria can include a data item date criterion and a data item custodian criterion, and the step of indexing the two or more stored data streams after receiving the search query can include indexing only data items within the two or more stored data streams matching the data item date criterion and the data item custodian criterion.

It is contemplated that the record manifest for the data stream can be created by extracting the metadata for the one or more data items in the data stream from the one or more data items in the data stream.

Also disclosed herein is a method of restoring a data item from an archive, including the steps of: receiving identification of a stub of a data item to be restored, the stub including a pointer to a record in the archive; retrieving the record from the archive; copying from the record into the stub of the data item only data contained in the record that is not present in the stub of the data item, thereby creating a restored data item. The restored data item can then be transferred from a first data storage location to a second data storage location, and the restored data item can be deleted from the first data storage location after transferring the restored data item to the second data storage location.

The foregoing and other aspects, features, details, utilities, and advantages of the present invention will be apparent from reading the following description and claims, and from reviewing the accompanying drawings.

The appendix to the specification contains additional illustrations of the methods and systems disclosed herein.

DETAILED DESCRIPTION

The present disclosure provides methods and systems (e.g., computer systems and software) for archiving and retrieving data. It should be understood that the teachings herein can be software-and/or hardware-implemented, and that they may be executed on a single CPU, which may have one or more threads, or distributed across multiple CPUs, each of which may have one or more threads, in a parallel processing environment.

For purposes of illustration, several exemplary embodiments will be described in detail herein in the context of archiving and retrieving various corporate records. It is contemplated, however, that the methods and systems described herein can be utilized in other contexts.

Figure 1:
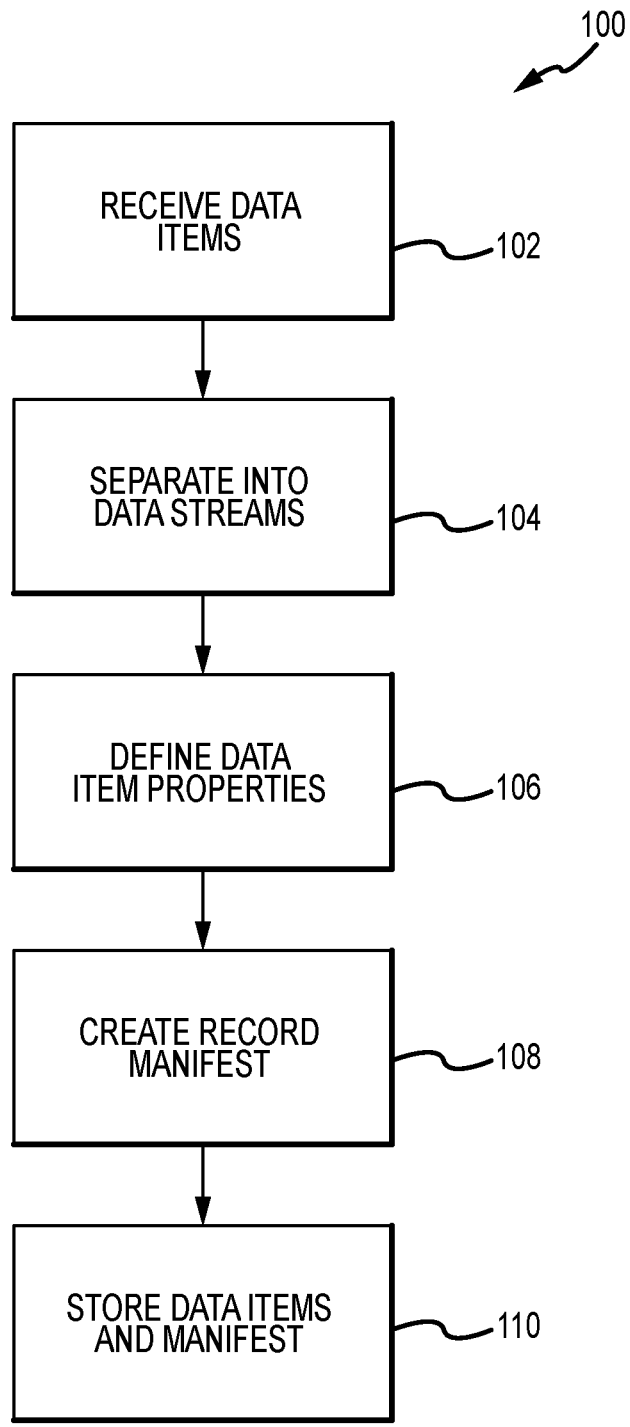
FIG. 1 is a flowchart of representative steps that can be carried out to archive data according to aspects of the instant disclosure.
Figure 2:
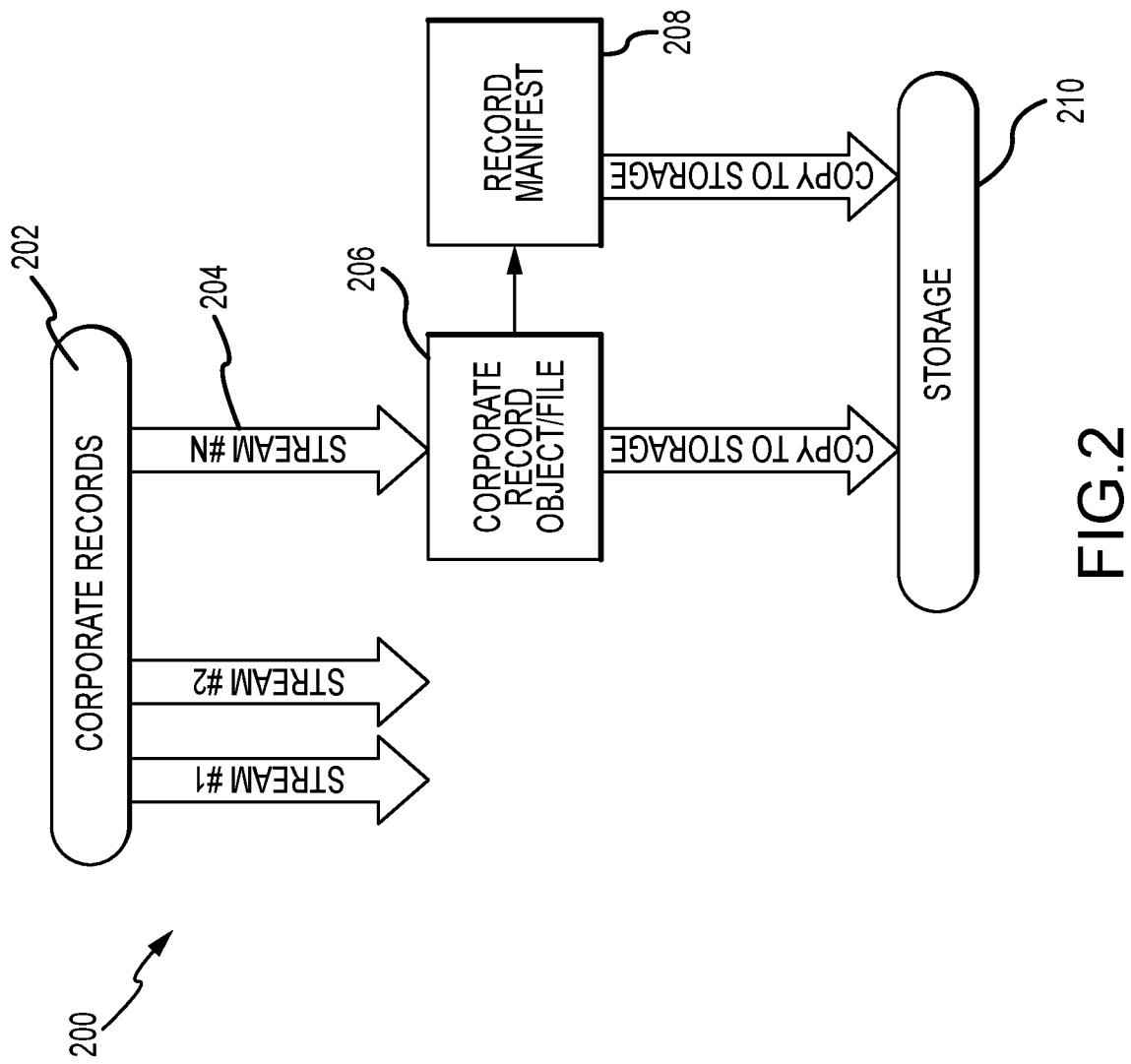
FIG. 2 is a schematic illustration of the representative data archiving process shown in FIG. 1.

FIG. 1 is a flowchart 100 of representative steps that can be carried out to archive data according to aspects of the instant disclosure. In block 102, a plurality of data items are received. This is illustrated in the schematic representation 200 of the archiving of data (e.g., corporate records 202) in FIG. 2.

In block 104, the data items (e.g., corporate records 202) are separated into a plurality of data streams 204 based upon a plurality of corresponding criteria. In embodiments of the disclosure, there can be a one-to-one correspondence between data streams 204 and criteria (that is, each data stream has a single corresponding defining criterion).

The criteria can correspond to a characteristic or category of the data items received. For example, corporate records 202 can be separated into a first data stream that contains employee personnel records, a second data stream that contains customer invoices, a third data stream that contains employee emails, a fourth data stream that contains corporate contracts, and so forth.

Each of the plurality of data streams 204 will therefore contain data items of a common type (e.g., all data items in a given data stream will be employee emails). Further processing of only a single data stream (e.g., stream N) containing employee emails will be described herein for the sake of illustration, though it should be understood that analogous steps can be carried out with respect to the remaining data streams (e.g., streams 1, 2, 3, . . . N-1).

In block 106, a plurality of data item properties are defined for the data stream. The data item properties correspond to and describe aspects of a particular data item within the data stream, such as corporate record 206 shown in FIG. 2.

It is desirable for the data item properties to include at least a data item date property and a data item custodian property. Additional data item properties can be user defined. For example, for the illustrative data stream of employee emails, then the data item properties can include, without limitation: CUSTODIAN; DATE; SENDER; RECIPIENTS; SUBJECT; and the like.

In block 108, a record manifest 208 is created for the data stream. The record manifest includes metadata for the data items within the data stream corresponding to the data item properties for the data stream. This information can either be manually entered or extracted directly from the data item.

For example, consider an email collected from John Smith's mailbox that was sent from Jane Doe to John Smith on Jan. 1, 2016, with the subject "Today's Meeting Agenda." For this data item, the custodian (e.g., John Smith), the date (e.g., Jan. 1, 2016), the sender (e.g., Jane Doe), the recipient(s) (e.g., John Smith), and the subject ("Today's Meeting Agenda") can be extracted from the email and added to record manifest 208. Those of ordinary skill in the art will appreciate that, after repeating this process for all the data items within the data stream, the record manifest will, in effect, become a database for the data stream, with each entry in the database corresponding to an individual data item within the data stream.

In block 110, the data items 206 from the data stream and the record manifest 208 are stored in storage 210. Storage 210 can be any suitable storage medium, including, without limitation, a storage area network (SAN), a network attached storage (NAS) device, cloud storage (e.g., Microsoft Azure, Amazon S3), a private cloud storage, a hybrid cloud storage, or the like.

Figure 3:
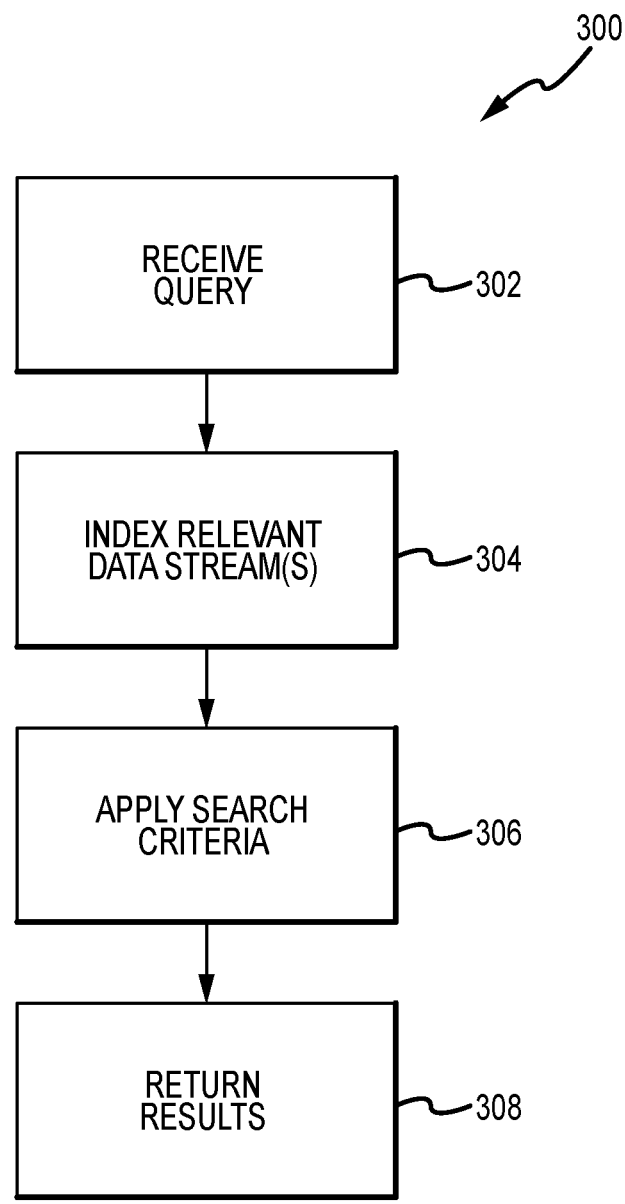
FIG. 3 is a flowchart of representative steps that can be carried out to search archived data according to aspects of the instant disclosure.

Advantageously, the data within storage 210 is merely at rest, and is not indexed except on demand, and then only to the extent necessary to satisfy a user request, as will now be described with reference to the flowchart 300 of exemplary steps shown in FIG. 3.

In block 302, a search query including a plurality of search criteria is received. The search criteria desirably include both a data item date criterion and a data item custodian criterion. The search criteria can also include an identification of a particular data stream to search.

For example, if a user wishes to search only employee emails prior to Jan. 1, 2016 collected from John Smith's mailbox, the search criteria can be structured to specify the employee email data stream, a data item custodian criterion of "CUSTODIAN=John Smith," and a data item date criterion of "DATE<Jan. 1, 2016." (Those of ordinary skill in the art will appreciate that the precise syntax of the search query may differ from the exemplary syntax shown here.)

In block 304, the stored data stream, which is otherwise at rest, is indexed. By waiting until the search query is received to index the data stream, computing resources, and thus financial resources, are conserved.

Further computing and financial resources can be conserved by limiting the extent to which the data stream is indexed in block 304. According to aspects of the disclosure, only data items having data item properties that match the data item custodian and data item date criteria are indexed, leaving the remaining data at rest. In the example above, therefore, only John Smith's emails from before Jan. 1, 2016 would be indexed; emails from other custodians or from other date ranges would be ignored.

In additional aspects of the disclosure, data items are only indexed with respect to data item properties corresponding to the search criteria. For example, if the user is interested only in emails collected from John Smith's mailbox that were sent from Jane Doe, there would be no need to index the "SUBJECT" data item properties; only the "SENDER" data item property would be relevant to the search.

Further computing resource and financial savings can be realized by indexing from record manifest 208 created in block 108, rather than from the raw data items 206 themselves.

In block 306, the search criteria are applied to the indexed data stream. Search results are returned in block 308.

The description above illustrates a search of a single data stream. It is contemplated, however, that searches can be executed on multiple data streams in parallel (rather than in series, as in extant search methodologies). In embodiments, therefore, the search criteria received as part of the search query in block 302 can correspond to data item properties that are common to multiple data streams stored in storage 210. Blocks 304, 306, and 308 can then be applied in parallel to the multiple data streams.

In another embodiment, the instant disclosure provides a method of restoring a data item, such as an email, a contact, a calendar entry, or the like, from an archive. It is known to archive such data items by creating copies thereof in the archival storage location and then removing the majority of the contents of the data item (e.g., the body of an email message and any attachments) from the primary storage location in order to reduce storage consumption. The portion of the data item that remains in primary storage is known as a "stub," and contains certain information regarding the data item (e.g., SENDER, RECIPIENT, SUBJECT, and the like), as well as a pointer to the copy of the original message in archival storage.

It is possible to modify the stub. For example, a user may wish to assign or remove a flag or assign, change, or remove a category of the data item represented by the stub.

Yet, because these changes to the stub are not reflected in the corresponding data item in archival storage, extant methods of restoring data items from an archive can lose these changes. In particular, extant methods of restoring data items from an archive typically delete the stub when importing the corresponding data item from the archive, thereby creating a data item that appears to be identical to the data item when it was archived, and that does not exhibit any post-archive changes made in the stub. This data loss can be disadvantageous.

Figure 4:
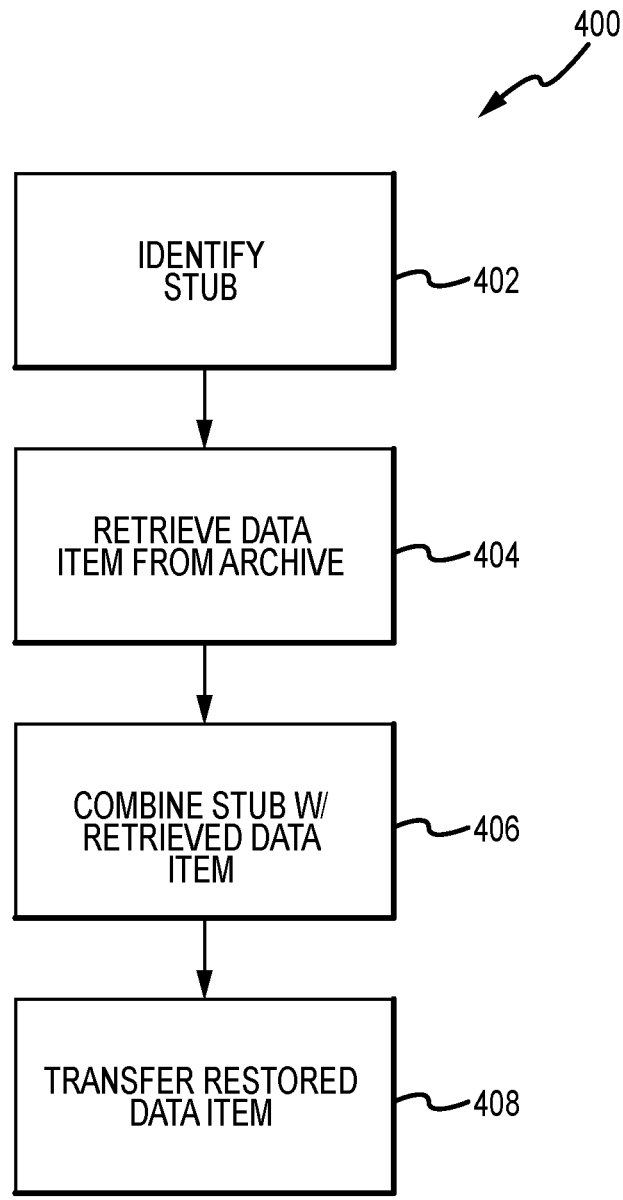
FIG. 4 is a flowchart of representative steps that can be carried out to restore archived data according to aspects of the instant disclosure.

FIG. 4 depicts a flowchart 400 of representative steps that allow data items to be restored from an archive without loss of data present in a stub by treating the stub and the corresponding archived data item as complementary parts of a whole. The stub of the data item to be restored is identified in block 402. In block 404, the corresponding data item is retrieved from the archive.

In block 406, the stub and the retrieved data item are combined in a manner that preserves any changes to the stub. In particular, only data contained in the retrieved data item that are not already present in the stub (e.g., the body of an email message and any attachments) are copied into the stub.

In optional block 408, the restored data item can be transferred to a new live (rather than archival) storage location. The data item can then be deleted in full from the original live (rather than archival) storage location.

Although several embodiments of this invention have been described above with a certain degree of particularity, those skilled in the art could make numerous alterations to the disclosed embodiments without departing from the spirit or scope of this invention.

All directional references (e.g., upper, lower, upward, downward, left, right, leftward, rightward, top, bottom, above, below, vertical, horizontal, clockwise, and counterclockwise) are only used for identification purposes to aid the reader's understanding of the present invention, and do not create limitations, particularly as to the position, orientation, or use of the invention. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other.

It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A method of archiving data, comprising:
   receiving a data stream to be archived, the data stream including a plurality of data items;
   defining a plurality of data item properties for the data stream;
   creating a record manifest for the data stream, wherein the record manifest comprises metadata for the plurality of data items in the data stream, wherein the metadata corresponds to the plurality of data item properties for the data stream; and
   storing the data stream and the record manifest for the data stream prior to indexing the data stream;
   receiving a search query including a plurality of search criteria;
   indexing the stored data stream after receiving the search query by indexing only data item properties of the stored data stream corresponding to the plurality of search criteria; and
   applying the search query to the stored indexed data stream.

2. The method according to claim 1, wherein the plurality of data item properties for the data stream comprises a data item date property and a data item custodian property.

3. The method according to claim 1, wherein
   the plurality of search criteria comprises a data item date criterion and a data item custodian criterion and the method further comprises
   returning search results after applying the search query to the indexed stored data stream.

4. The method according to claim 3, wherein indexing the stored data stream after receiving the search query comprises indexing only data items within the stored data stream matching the data item date criterion and the data item custodian criterion.

5. The method according to claim 1, wherein receiving a data stream to be archived further comprises separating the plurality of data items to be archived into a plurality of data streams according to a plurality of preset criteria.

6. The method according to claim 5, further comprising repeating the receiving, defining, creating, and storing steps for each data stream of the plurality of data streams.

7. The method according to claim 6, further comprising:
   receiving a search query including a plurality of search criteria that correspond to data item properties common to two or more stored data streams of the plurality of stored data streams;
   indexing the two or more stored data streams after receiving the search query;
   applying the search query to the two or more indexed stored data streams;
   returning search results after applying the search query to the two or more indexed stored data streams.

8. The method according to claim 7, wherein indexing the two or more stored data streams after receiving the search query comprises indexing only data item properties of the two or more stored data streams corresponding to the plurality of search criteria.

9. The method according to claim 7, wherein the plurality of search criteria comprises a data item date criterion and a data item custodian criterion, and wherein indexing the two or more stored data streams after receiving the search query comprises indexing only data items within the two or more stored data streams matching the data item date criterion and the data item custodian criterion.

10. The method according to claim 1, wherein creating the record manifest for the data stream comprises extracting the metadata for the plurality of data items in the data stream from the plurality of data items in the data stream.

* * * * *